C. R. DAVIS.
FRONT WHEEL AND DRAFT STRUCTURE FOR HAY LOADERS.
APPLICATION FILED FEB. 5, 1918.
1,361,369.
Patented Dec. 7, 1920.
2 SHEETS—SHEET 1.
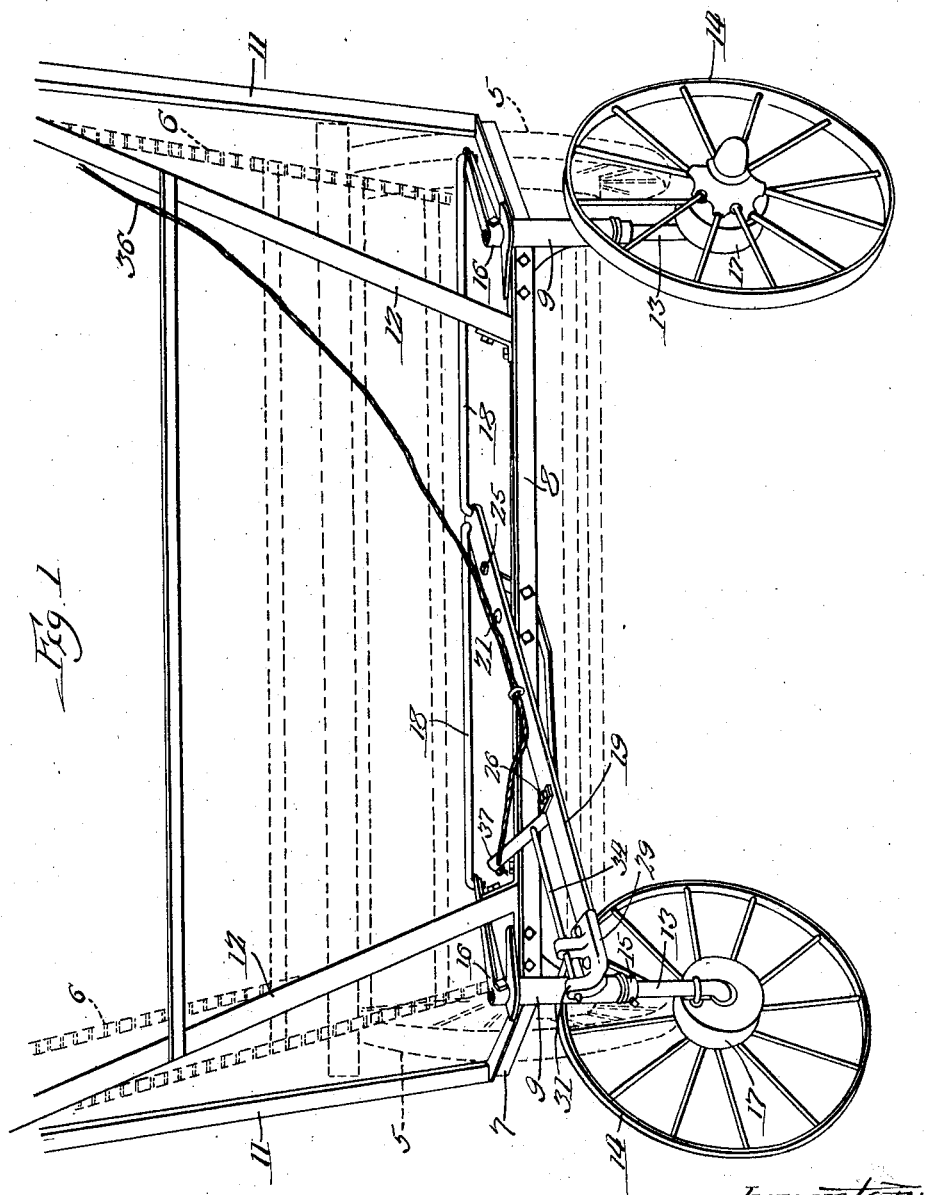

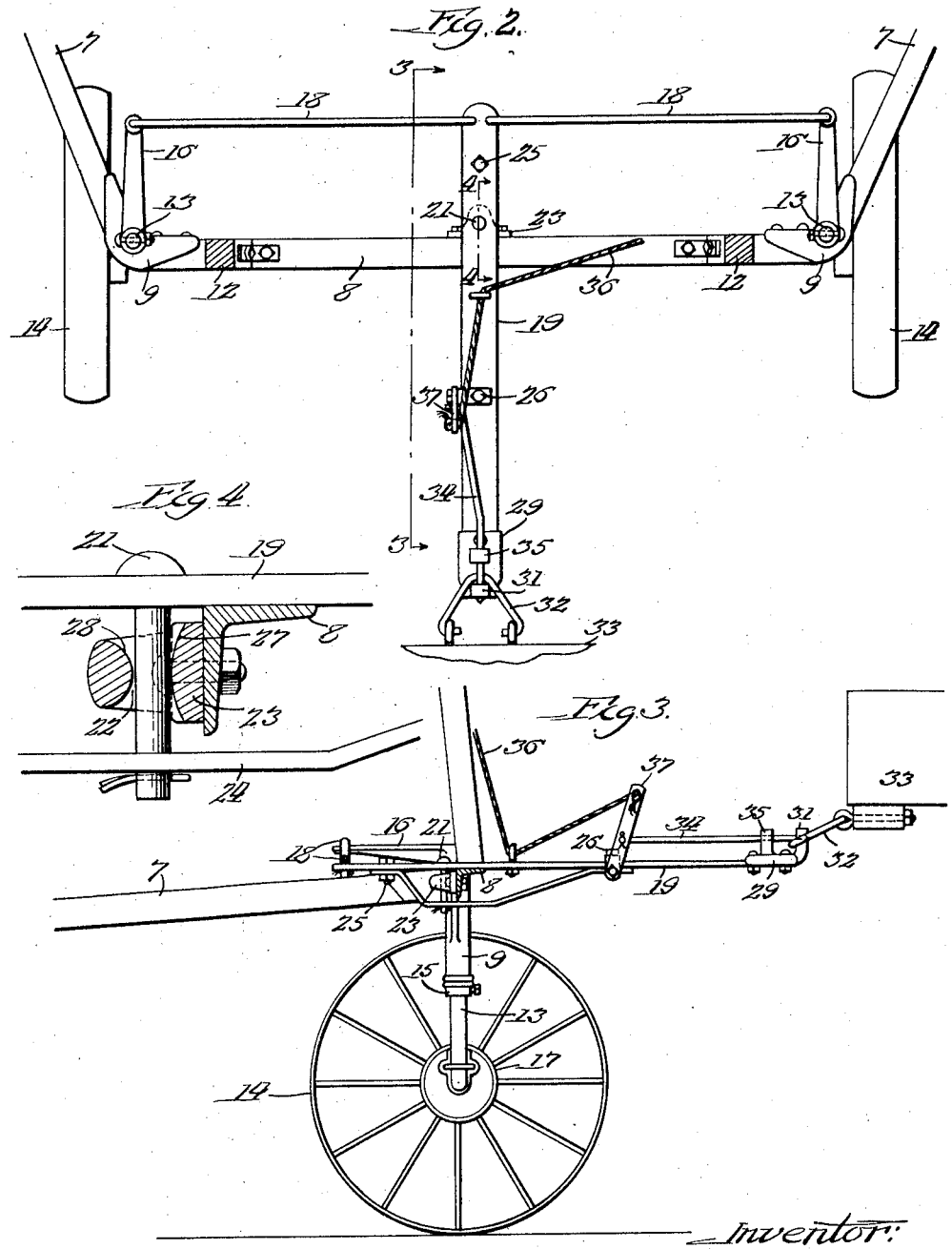

UNITED STATES PATENT OFFICE.

CALVIN R. DAVIS, OF ROCKFORD, ILLINOIS, ASSIGNOR TO EMERSON-BRANTINGHAM COMPANY, OF ROCKFORD, ILLINOIS, A CORPORATION OF ILLINOIS.

FRONT WHEEL AND DRAFT STRUCTURE FOR HAY-LOADERS.

1,361,369.  Specification of Letters Patent.  Patented Dec. 7, 1920.

Application filed February 5, 1918. Serial No. 215,490.

*To all whom it may concern:*

Be it known that I, CALVIN R. DAVIS, a citizen of the United States, residing at Rockford, in the county of Winnebago and State of Illinois, have invented certain new and useful Improvements in Front Wheels and Draft Structures for Hay-Loaders, of which the following is a specification.

This invention relates in general to hay loaders, chiefly of the cylinder type, having forward and rear carrying wheels, the latter of which drive the hay gathering and elevating means and the former serve to carry the forward loader structure and are dirigible so as to permit turning of the loader. The present improvements pertain more particularly to the front wheel and draft structure of this class of implements.

Heretofore, the fore-end of a hay loader of this type has been supported by carrying wheels and an axle which oscillate about a king bolt. Such a construction is inherently unsatisfactory for several reasons. In passing over uneven ground the axle vibrates incessantly, that is, jerks back and forth, as one wheel or the other runs into a rut or hollow, thereby not only rendering the draft unsteady and the support wabbly, but causing continual strain and twisting of not only the draft attachment but other appurtenant parts. And, as a consequence of the unsteady support afforded by such a structure, the relatively high delivery end of the loader often swings and vibrates sidewise and delivers portions of the hay at the extreme sides of the load and sometimes entirely off the same.

In the present invention, I have aimed, primarily, to overcome the objectionable features inherent in hay loader structures of the class mentioned, and in furtherance of this general object I have provided an improved front wheel and draft structure simple and practical both from manufacturing and service view points, and by means of which a hay loader will be easier running, more steadily supported, will follow the load more accurately, and withal will be capable of more effectual and satisfactory operation under all conditions of usage than is possible with structures heretofore provided.

With these ends in view I have directly mounted in laterally spaced relation at the fore-end of a loader, a pair of dirigible supporting wheels so that the loader is directly supported and adequately braced at its front sides. To these dirigible wheels I have attached a centrally disposed draft bar which holds the wheels in parallel relation and when swung laterally will similarly angle the same. Consequently, when the draft bar is attached to a hay rack or wagon the wheels will be steadily and accurately guided so that the loader will follow the rack in perfect alinement therewith. The draft bar is also constructed so as to be freely movable sidewise and vertically for permitting quick and easy attachment to the wagon in case the latter is not backed in correct alinement with the loader.

Referring to the drawings,—

Figure 1 is a front elevation of a hay loader equipped with one practical embodiment of my improvements, showing fully only those parts of the loader necessary for a clear understanding of the present invention.

Fig. 2, a plan view of the front wheel and draft structure, with the draft pole in alinement with the longitudinal axis of the loader as distinguished from being swung to one side as illustrated in Fig. 1;

Fig. 3, a vertical sectional view taken substantially on the line 3—3 of Fig. 2; and Fig. 4, an enlarged sectional view taken substantially on the line 4—4 of Fig. 2;

Referring to Fig. 1, it will be apparent to those familiar with this art that the hay loader partially illustrated is of the cylinder type, that is, comprises a revolving hay-gathering cylinder co-axial with the carrying and drive wheels 5 and an endless carrier 6 which, trained over the cylinder, elevates the hay gathered by the rake teeth on the cylinder and delivers the hay onto a rack behind which the loader is drawn. Since the present improvements pertain directly to the front wheel and draft structure, I have shown and will describe only such parts of a loader as are necessary for a complete and clear understanding of the invention. The frame of the loader includes side bars 7 and a front bar 8 formed in this instance of angle iron and bolted to the wings of the upright tubular spindle brackets 9 which are suitably shaped, as shown, to provide a substantial connection between the frame bars. Upright bracing and supporting bars 11 and 12 are secured respectively at their lower ends to the bars 7 and 8 and connected at their upper ends with the upper loader structure in a manner shown in my co-pending application Serial No. 222,398, for hay loaders. In each of the spindle brackets 9 which, as is obvious, are disposed at both sides of the loader, is positioned a carrying wheel spindle 13 upon the lower end of which is revolubly mounted a carrying-wheel 14. The spindles 13 while revoluble in the brackets 9 are confined against lengthwise movement by collars 15 and arms 16 respectively secured to the spindles immediately below and above the spindle brackets. The carrying wheels 14 which turn with the spindles 13 about their upright axes may be mounted on the spindle in any suitable manner, and in the present instance shields 17 are provided for preventing the hay from winding about the hubs of the wheels. The arms 16 fixed to the wheel spindles and positioned in substantially parallel relation with their respective carrying wheels are pivotally connected by separate links 18 to the rear end of a draft-bar 19. This draft-bar, interposed centrally between the carrying wheels and pivotally connected intermediate its ends to the front frame structure, is adapted to be attached at its front end to a wagon or rack upon which the hay is to be loaded. The draft-bar not only serves as its name implies, to draw the hay loader, but also through its connection with the front carrying-wheels, holds them in parallel relation and steers them when the draft-bar is swung sidewise by turning movement of the wagon so as to similarly turn the carrying-wheels and cause the hay loader to easily follow the wagon and be immediately responsive to any turning movement thereof. The pivotal connection between the draft-bar and the frame is designed so that the draft-bar has practically a universal movement, that is, is capable of swinging vertically as about a horizontal pivot and horizontally as about a vertical pivot. It follows, therefore, that the front end of the draft-bar is free to follow any movement of the wagon and yet perform its proper function with regard to steering the carrying wheels. Another advantage of this mounting is that when the hay rack or wagon is backed up to the loader for attachment thereto it frequently happens that the wagon is not backed in proper alinement with the loader. This, however, does not prevent quick and easy attachment of the draft-bar to the wagon because the draft-bar may be swung up and down or sidewise in accordance with the position of the attaching means on the wagon. This capability of quick attachment under all conditions is especially desirable because in certain structures heretofore employed it is necessary, when the wagon is not properly alined with the loader to shift the wagon laterally into proper alinement. The pivotal connection of the draft-bar to the frame, best shown in Figs. 3 and 4, comprises a pivot bolt 21 passing through the draft-bar, an opening 22 in a bracket 23 fixed to the frame bar 8, and also through a brace rod 24 disposed at the underside of the bar 8 and fixed at its ends by means of bolts 25 and 26, to the draft-bar. As will be noted viewing Fig. 4, the opening 22 is elongated at its upper and lower ends by curving the front and rear surfaces 27 and 28 respectively, of the wall defining the opening so that the pivot bolt may be tilted forwardly and backwardly as about a horizontal pivot when the front end of the draft-bar is raised or lowered. The opening, however, is of uniform lateral width so as to preclude lateral tilting of the pivot pin. It will be evident that while the draft-bar 19 simply rests on the front frame bar 8, the draft is applied to the curved surface 27 through the agency of the pivot bolt 21 and that said bolt will be held in contact with said curved surface during any tilting position of the draft-bar while draft is applied.

Suitable means may be employed for detachably connecting the draft-bar at its front end to a wagon. In the present instance I have equipped the draft-bar with a bracket 29, the upwardly projecting ear 31 of which is adapted to be passed through a looped link 32 pivotally attached to the wagon box 33, and have provided a bolt 34 slidable in the ears 31 and 35 for locking the link 32 in connection with the draft-bar. The sliding bolt 34 may be withdrawn from locking position by the operator on the wagon pulling a cable 36 which actuates the sliding bolt through the agency of a lever 37 pivoted on the draft-bar.

By reason of the foregoing construction the draft-bar may be quickly and easily attached to a hay rake or wagon whether the point of attachment thereon is high or low, since the draft bar may be swung upwardly or downwardly at its front ends to accommodate the height of attachment, and in the event that the wagon is not backed to the loader in alinement therewith, the draft-bar may be easily swung laterally in order to reach the point of attachment. It is thus seen that the draft attachment is designed for quick and easy connection to a wagon under all the varying conditions of usage. During operation the loader will be drawn steadily and guided easily behind the wagon, because the front carrying wheels are not subject to swinging back and forth so as to rock the frame every time an obstruction or hollow is met, as is the case when the fifth wheel type of front wheel structure is employed. By mounting the front carrying-wheels directly on the side portions of the frame, the wheels may be spaced well apart so that the load is more evenly distributed to and carried directly by the respective carrying wheels. By connecting the wheels to the draft-bar so as to be angled in unison therewith, the wheels are immediately responsive to any turning movement of the wagon. It is believed that this conveys a clear understanding of my improvements, and it should be understood that while I have illustrated one practical working embodiment thereof, various changes might be made in the construction and arrangement without departing from the spirit and scope of the invention as expressed in the appended claims.

I claim:

1. The combination of a frame, carrying wheels therefor including front carrying wheels pivotally mounted on the frame to turn about separate upright axes, a draft-bar interposed between the front carrying wheels and pivotally connected to the frame through the agency of a pivot pin passing through an opening in a part fixed to the frame, which opening is restricted so as to hold the pivot pin against tilting laterally and is elongated at one end to permit vertical movement of the draft-bar at its forward end for vehicle attachments of different heights, and means connecting the draft-bar with the front carrying wheels so as to maintain the latter in substantially parallel relation with the draft-bar.

2. In a hayloader, the combination of a frame including horizontally disposed lower side bars and a front bar, traction wheels supporting the rear end of the frame, pivot steering wheels supporting the front end of the frame and connected thereto at the juncture of the side and front bars and each adapted to turn about a separate vertical axis, an inclined elevator frame, and upright supporting bars between said side and front bars and the inclined elevator frame, whereby the upper end of said frame at each side is directly supported through the agency of said upright bars and the pivot steering wheels at the adjacent side of the frame.

CALVIN R. DAVIS.